Figure 1:
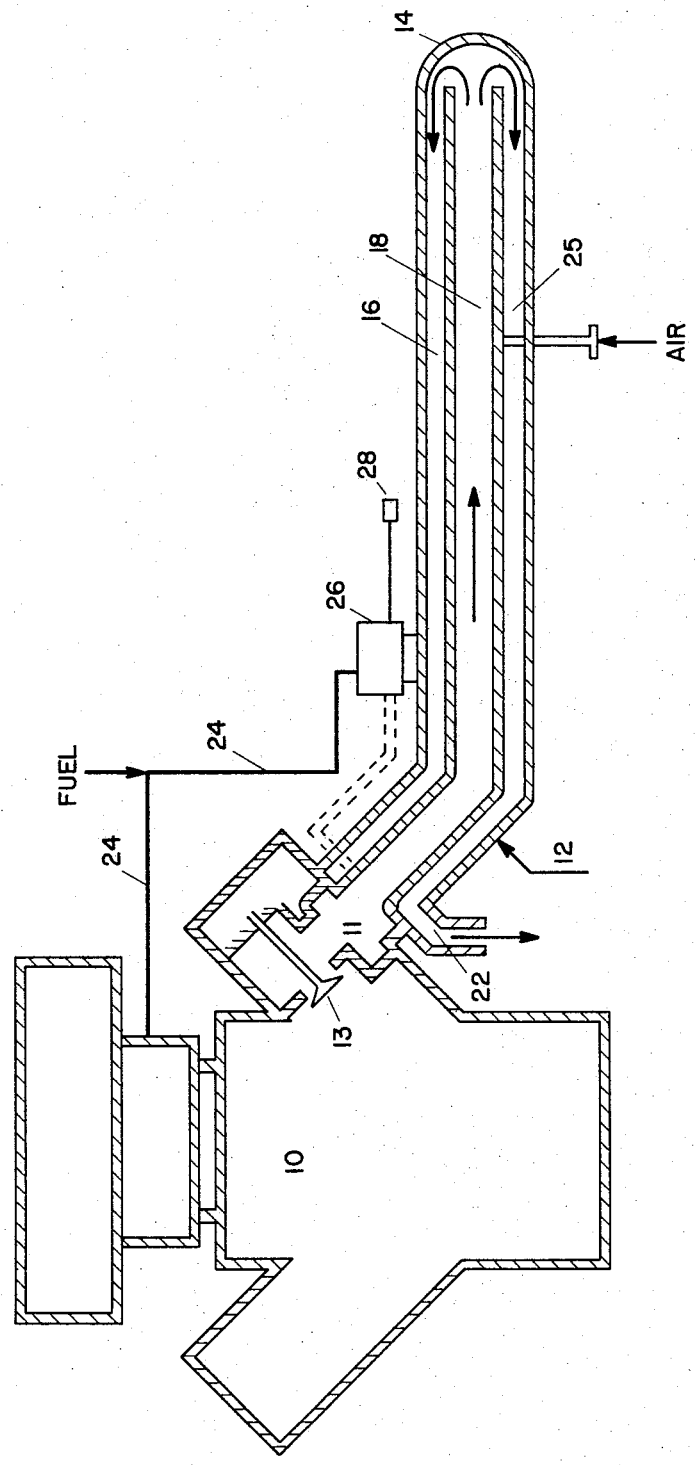

United States Patent [19]

Myerson

[11] 3,867,507

[45] Feb. 18, 1975

[54] METHOD FOR REMOVING THE OXIDES OF NITROGEN AS AIR CONTAMINANTS

[75] Inventor: Albert L. Myerson, Mountainside, N.J.

[73] Assignee: Exxon Research and Engineering Company, Linden, N.J.

[22] Filed: Mar. 16, 1973

[21] Appl. No.: 341,842

Related U.S. Application Data

[63] Continuation-in-part of Ser. No. 246,841, April 25, 1972, abandoned.

[52] U.S. Cl.................... 423/212, 423/235, 60/274, 60/303
[51] Int. Cl............................................. B01d 53/34
[58] Field of Search............. 423/212, 213.2, 213.5, 423/239, 351, 235; 60/274, 303

[56] References Cited
UNITED STATES PATENTS

| | | | |
|---|---|---|---|
| 1,154,171 | 8/1915 | Brownlee et al. | 423/351 |
| 3,370,914 | 2/1968 | Gross et al. | 423/213.2 |
| 3,476,508 | 11/1969 | Kearby et al. | 423/213.2 |
| 3,656,915 | 4/1972 | Tourtellotte | 423/213.2 x |
| 3,696,618 | 10/1972 | Boyd et al. | 423/213.2X |

Primary Examiner—G.O. Peters
Attorney, Agent, or Firm—John Paul Corcoran

[57] ABSTRACT

A method for treating a stream of combustion effluents, containing $NO_x$ and other contaminants, said method comprising the steps of first contacting the stream with a sufficient amount of hydrocarbon in the presence of oxygen at a temperature ranging from 400 to 2,700°C. for sufficient time to substantially reduce the $NO_x$ to molecular nitrogen; contacting the reduced stream with sufficient oxygen at a temperature ranging from 400 to 2,700°C. for a time sufficient to substantially oxidize all other contaminants to an oxidized state. It has been found that this reduction can also be carried out in an intermittent manner in which the reducing hydrocarbon-oxygen mixture can be shut off for hours at a time with continuing NO- removal (the self-contained reductant mode).

7 Claims, 3 Drawing Figures

EFFECT OF O₂ IN MINIMIZING (HCN)

METHOD FOR REMOVING THE OXIDES OF NITROGEN AS AIR CONTAMINANTS

This application is a continuation-in-part of an application filed Apr. 25, 1972 bearing Ser. No. 246,841 now abandoned.

This invention relates to the treatment of combustion effluent and waste products in a multiple zone system in a manner which renders them less objectionable for discharge to the atmosphere.

In one aspect, this invention relates to the chemical reduction of $NO_x$ by hydrocarbons and oxygen at elevated temperatures.

In another aspect, this invention relates to the chemical reduction of $NO_x$ in a noncatalytic manner.

The oxides of nitrogen referred to collectively as $NO_x$ constitute a family of air contaminants. The most important ones are listed as follows:

| Formula | Chemical Name | |
|---|---|---|
| NO | Nitric oxide | Colorless, odorless gas |
| $NO_2$ | Nitrogen dioxide | Brown pungent gas |
| $N_2O_4$ | Dinitrogen tetroxide | Brown volatile liquid |
| $N_2O$ | Nitrous oxide | Colorless, odorless gas |

Of these, $N_2O$ can be eliminated from consideration as an air contaminant. Emission sources are rare and it has no effect whatever at low concentrations. At a concentration of 30 percent or so, it is useful as an anesthetic. $N_2O_4$ is a polymer of $NO_2$ which forms when the $NO_2$ is compressed and liquefied. When $NO_2$ is diluted to any extent with air, $N_2O_4$ does not exist in significant amounts.

Combustion effluent and waste products from various sources are discharged into the atmosphere. Unless the waste products are treated to remove deleterious components, the waste products may contaminate the atmosphere. Much of the $NO_2$ contamination comes from automobiles and fuel-burning processes. However, chemical and manufacturing processes and power plants contribute to the problem and also cause such nuisances. Most of the oxides of nitrogen are produced by oxidizing fuels during which a part of the oxygen combines with atmospheric nitrogen in the flame rather than with the fuel. This process is called nitrogen fixation and occurs in flames. specific examples are exhaust products from automotive engines and combustion effluents from stationary sources such as power plants and industrial boilers. Such waste products contain one or more components such as unburned hydrocarbon, carbon monoxide, nitrogen oxides, sulfur compounds, partially oxidized products, etc., in various concentrations. Part or all of these are believed to contribute to the smog problem presently facing various geographical areas of the United States and other countries.

It is believed that these combustion products react with oxygen under the influence of sunlight to produce smog. With the growing number of automobiles, particularly in urban areas, the discharge of such waste products in the atmosphere will further increase and aggravate the problem.

Methods for converting vehicular exhaust gases to less harmful material, such as carbon dioxide, nitrogen and water vapor may be either catalytic or of the thermal conversion type. In the catalytic method, the exhaust gases are passed into contact with a suitable conversion catalyst prior to discharge in the atmosphere. In the thermal method for hydrocarbon and CO removal, the exhaust gases are heated to or are maintained at a sufficiently high temperature in the presence of oxygen to burn without utilization of the catalyst but this does not remove nitric oxide. With either method, it is necessary to provide a stoichiometric amount or preferably an excess amount of oxygen or air in the exhaust gas stream except for the catalytic removal of NO by CO.

It has also been found that many of the desirable catalysts for effecting the oxidation and treatment of the waste product stream for improving it, including the reduction of NO by CO, prior to discharge into the atmosphere, are harmfully affected by lead or lead compounds, minor components of the gasoline including phosphorus, sulfur and lead compounds.

Similarly, other compounds from waste industrial gases, other than auto or engine exhaust streams may have exerted a poisoning effect on a catalyst bed and it is an advantage to device a system whereby no catalytic material is needed to initiate the removal of $NO_x$ from the streams.

It has previously been thought that chemical reduction of $NO_x$ through addition of fuel into the exhaust system might not achieve reduction in the desired sense of causing it to form $N_2$. It was the scientific feeling that such reduction would merely convert some of the $NO_x$ into undesirable nitrogenous products which are equally objectionable. H. P. Schuchmann and K. J. Laidler suggested in the Journal of the Air Pollution Control Association, Vol. 22, No. 1, pages 52 and 53 (January 1972) that the use of hydrocarbons for $NO_x$ reduction mainly, produces undesirable reduction products. Contrary to this teaching, it has now been discovered that a thermally activated gas phase chemical kinetic reaction can be employed to control $NO_x$ emission problems. This method provides an additional advantage in the case of stationary sources in that cheaper and/or more readily available fuels having high nitrogen content can be used, since the extra nitric oxides thus formed from combustion of these fuels, can also be reduced by this method; for example, shale oil, coal and some heavy petroleum fractions.

Briefly, the present invention provides a method for treating a combustion effluent or waste product stream containing $NO_x$ and other contaminants, said method comprising the steps of first contacting the stream with a sufficient amount of hydrocarbon in the presence of oxygen at a temperature ranging from 400° to 2,700°C. for a sufficient time to substantially reduce the $NO_x$ to molecular nitrogen; then contacting the reduced stream with sufficient oxygen at a temperature ranging from 400° to 2,700°C. for a sufficient time to substantially oxidize all other contaminants to an oxidized state.

It should be noted that the hydrocarbons and substituted hydrocarbons described herein are far more effective and powerful gas-phase, non-catalytic reducing agents for NO, than species such as carbon monoxide (CO) and hydrogen ($H_2$) which have been found, by the experiments in the apparatus used herewith, to be essentially ineffective at the conditions herein described. Also, it is important to realize that this present concept of adding hydrocarbon or substituted hydrocarbons and oxygen to the effluent or exhaust stream is a wholly different concept from adding additional fuel to the primary combustion zone, which is simply "running fuel rich" as it is commonly termed. In the latter case, it is possible to decrease $NO_x$ by a certain limited amount, by lowering the adiabatic flame temperature and by the concurrent reduction in the oxygen available to form nitrogen oxides due to the excess hydrocarbon present during the actual combustion, but in the present case, the hydrocarbon and oxygen are added after combustion is complete, and any $NO_x$ previously formed is chemically reduced under controlled conditions in the effluent stream. This allows the designer to run the engine or burners as he feels is best for the process, rich or lean, which is a most significant advantage. It is also a wholly different concept from "afterburning" (such as in the John Zink process as described in British Pat. No. 1,274,637) in which another smaller flame is actually maintained downstream of the primary flame by injecting fuel and burning it, in order to incinerate contaminating gases.

The invention may be better understood by reference to the following drawings wherein:

FIG. I is a diagrammatic view of an internal combustion engine employing this invention;

FIG. II is a diagrammatic view of a stationary source employing this invention;

FIG. III is a graphic illustration showing the effect of increasing the oxygen concentration.

In a more specific embodiment of the present invention, there is provided a method and apparatus for treating the exhaust gas of internal combustion engines containing CO, $NO_x$ and other contaminants, said method comprising first contacting the exhaust gas with a sufficient amount of gasoline, along with a small, carefully adjusted amount of air, at a temperature ranging from 900°C. to 1,450°C. for a sufficient time to reduce the $NO_x$ to molecular $N_2$ and then contacting the reduced exhaust gas with a sufficient amount of oxygen in air to oxidize the excess hydrocarbon, CO, and small amounts of $NH_3$ and HCN, to equally small amounts of NO and less objectionable products upon their admission to the atmosphere. The small amount of NO thus formed together with the small amount of NO left unreduced, will remain significantly less than maximum acceptable tolerances.

The present invention may be more clearly understood and explained in connection with its use for removing $NO_x$ compounds from the exhaust of internal combustion engines when read in conjunction with the accompanying drawing wherein FIG. 1 represents a diagrammatic showing of an internal combustion engine employed in this invention.

Referring to FIG. 1 there is disclosed the general showing of an apparatus or engine system wherein the invention is used; such system consists basically of an internal combustion engine 10 with an exhaust system including an exhaust manifold 11 leading to a heat exchanger 12 which is in connection with a muffler not shown. Valve 13 is the exhaust valve and functions in accordance with normal design characteristics of the engine employing the invention.

The heat exchanger 12 can take the form of any suitable shape such as an elongated hollow cylinder. The exchanger is made of any satisfactory structural material such as stainless steel or other high temperature alloy or ceramic. The cylinder is closed at one end 14. A concentric hollow tube 18 extends axially along the inside of the cylinder to define the inner reactor passageway 18 and the concentric, exit passageway 16 and 25. Passageway 18 connects with the engine cylinder through valve 13 so that the exhaust gas passes therethrough. Passages 16 and 25 allow for the return of the treated exhaust gases so that their heat is taken advantage of in passage 18. Passageway 16 and 25 connect with the muffler (not shown) through passageway 22.

The hydrocarbon injection can take place through a fuel source which in the case of automobiles can be the original source of power for the engine which then is passed via line 24 to a carburetor 26. The carburetor is then activated by an automatic throttle control 28 to pass, into the passage 18, sufficient fuel and air to cause reduction of the $NO_x$ components contained in the exhaust gas.

In addition, excess air is interjected into passage 18 at the lower end thereof, to account for the oxidizing of excess hydrocarbon as well as any carbon monoxide and other oxidizable contaminants contained in the fuel.

Figure 2:
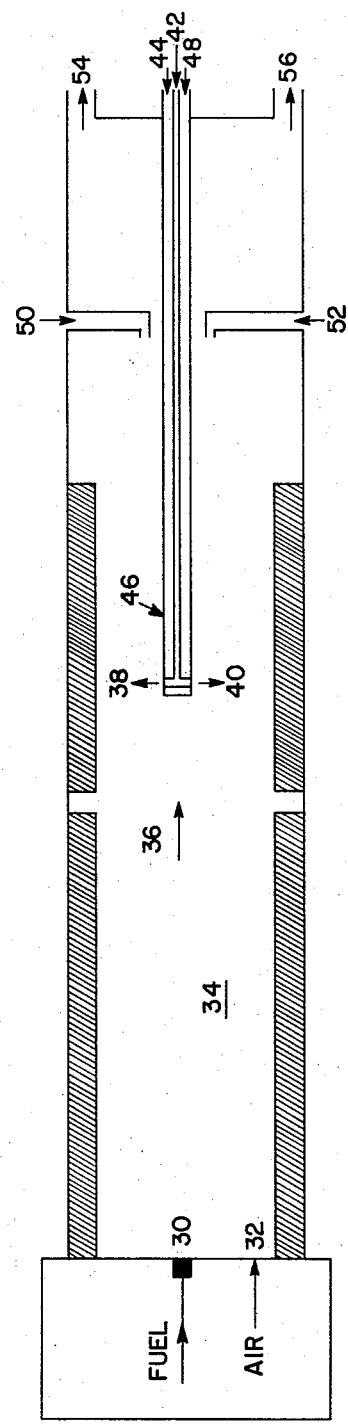

The concept has been tested in a commercial furnace, a schematic of which is shown in FIG. 2 of the accompanying drawing. This furnace burns any regular fuel oil (such as No. 6) which enters furnace at 30, with air added at 32. The principal flame occurs at the main combustion area 34 and the heat is usually used to heat a boiler. The nitric oxide formed is carried downstream in the effluent gas 36, where it is met and mixed with the necessary mixture of a hydrocarbon and nitrogen. Air (oxygen) is not needed with the hydrocarbon in this case, since the furnace effluent generally carries enough excess oxygen downstream 36, to provide the correct ratio of $[O_2]/[C]$. The hydrocarbon issues forth from a water-cooled probe at points 38 and 40, and is supplied to the probe at 42. The watercooling occurs in a jacket around the inner tube, through 44, 46 and 48. Cheaper burner fuels containing high nitrogen contents which produce more $NO_x$ can be used here, by merely increasing appropriately, the flow-rate of hydrocarbon added. The unburned hydrocarbon, CO and any small amounts of HCN and $NH_3$ are oxidized at a final stage by adding air at 50 and 52 at the elevated temperatures of the effluents. The clean effluent finally exits at 54 and 56. The $[O_2]/[C]$ ratio must be maintained greater than 1.0 at a range of from 800°C. to 2,000°C. and preferably from 800°C. to 1,700°C.

Any hydrocarbon, as well as oxygen-containing hydrocarbons, sulfur-containing hydrocarbons, nitrogen-containing hydrocarbons, halogen-containing hydrocarbons, which yield carbon containing free radicals on pyrolysis under the conditions shown can be employed in this concept. In the case of a fuel operated mobile source, the fuel itself such as gasoline, would be the most convenient and effective reducer. Suitable hydrocarbons include methane, ethane, the propanes, butanes, pentanes, hexanes, heptanes, octanes, nonanes, dodecanes, as well as aromatic compounds consisting of benzene, naphthalene, anthracene, toluene, mesitylene. Suitable oxygenated hydrocarbons include alcohols, ethers, acids, ketones end aldehydes.

There are two critical ratios which are used in this method to optimize the favorable reduction of NO. One is $[C]/[NO_x]$ which is the total number of carbon atoms per mole of $NO_x$ supplied by the hydrocarbon, CnHm, wherein $n$ ranges from 1 to 12 and $m$ is any integer corresponding to an existing compound, and the other is $[O_2]/[C]$ (this follows as the quotient, of the ratio $[O_2]/[NO]$ mentioned in the previous filing and $[C]/[NO]$). Where there is no excess oxygen present in the combustion effluent, the ratio of $C]/[NO_x]$ ranges from 0.02 to 400. Preferably, the ratio of $C]/[NO_x]$ ranges from 4:1 to 32:1. It is to be understood that the lowest limit would be the stoichiometric amount of hydrocarbon necessary to form carbon monoxide, nitrogen and other products with the nitrogen oxides. The ratio $[O_2]/[C]$ can vary between 0.01 and 12, in general. Preferably, the ratio of $[O_2]/[C]$ ranges from 0.25 to 1 with optimum NO-reduction performance between 0.5 and 0.8. When carbon monoxide, CO, is present in the effluent, the amount of oxygen must be increased to oxidize the CO to $CO_2$. If excess oxygen is already present in the combustion effluent, then sufficient hydrocarbon or other reductant must be added to provide the desired optimum $[O_2]/[C]$ ratio. It is to be understood that any of the oxygenated hydrocarbons, as well as the other compounds containing heteroatoms would operate within the same ranges as the hydrocarbons. However, it is to be understood that any carbon atoms bound to oxygen in such compounds are not considered in the carbon to oxygen ratio.

The temperature for the reduction step ranges from 400°C. to 2,700°C. and preferably from 700°C. to 2,200°C., more preferably from 700°C. to 1450°C. in the exhaust from an internal combustion engine. Because of the chemical kinetics, the temperature which is used is greatly influenced by the $[C]/[NO_x]$ ratio and by the residence time in passageway 18. The residence time in passageway 18 ranges from 25 to 300 milliseconds, preferably from 100 to 250 milliseconds.

This reaction can be carried out over a wide range of pressures, i.e., 0.1 to 100 atmospheres, preferably 1 to 40 atmospheres. The pressures are not critical and the chemical kinetics are adjusted to fit these conditions. The velocities of the combustion effluent as well as the mixing of the hydrocarbons in the postcombustion zone are regulated so that there is a sufficient residence time to enable the hydrocarbon to reduce the NO from the combustion effluents. Under most circumstances, operating at higher pressure requires less residence time.

It has also been observed that when the hydrocarbon and oxygen are turned off, reduction of the NO continues for a time thereafter. This continuous reduction lasts for as long as several hours as a result of hydrocarbon air addition lasting only a small fraction of that time (e.g., 10 minutes) and is called the Self-Contained Reductant Mode, since the reductant exists on the walls of the stream tube. This effect is demonstrated in runs 7 and 8. Sufficient wall area relative to the main flow is required for this to take place.

The invention is demonstrated in the following examples.

EXAMPLE 1

A typical exhaust gas containing 1000 ppm NO, 13 percent $CO_2$ and 1 percent CO flows through the exhaust manifold 11 and reducing section 18 at an average temperature of 1,227°C. after leaving the exhaust valve 13. By allowing its residence time at this average temperature to total 100 milliseconds after introduction of 0.1 percent isobutane and 0.25 percent $O_2$ (0.25percent already present) (since the concentration of NO is 0.1% and the ratios $[C]/[NO]$ and $[O_2]/[NO]$ are 4 and 5, respectively), the concentration of NO will be reduced to 50 ppm. Any small, residual amounts of contaminants are oxidized in the Oxidizer Reactor Section, before passing into the muffler. This example is shown in the second case of Table I.

Other examples in Table I illustrate the effects of various parameters on the reducing ability of this process. By increasing both ratios $[C]/[NO]$ and $[O_2]/[NO]$, for example, by a factor of 3.3., NO is reduced in Case 2 to 50 as compared to 270 ppm in 1. In Case 3, a reduction of 100°C. in temperature causes [NO] to rise 100 ppm. By increasing the $[C]/[NO]$ ratio and decreasing the $[O_2]$ in Case 4, [NO] increases to 650 ppm, but then in Case 5, increasing the $[O_2]/[NO]$ ratio from 0 to 7 causes [NO] to drop to 120 ppm. Case 6 illustrates the effect in a mixture with no $CO_2$ or CO, in which it is seen that a higher temperature is required when no $CO_2$ or CO is present.

Cases 7 and 8 are examples of an effect newly discovered in this work, in which it has been found that a reductant consisting of a hydrocarbon-like material, is laid down on the reactor wall for a period of time, e.g., 5 or 10 or more minutes, by flows of $iC_4H_{10}$ and $O_2$ such as those listed in 7 and 8. When the $iC_4H_{10}$ and $O_2$ are turned off, reduction of the NO continues for one-half hour and 1 hour, respectively. This has been named the Self-Contained Reductant Mode (SCR Mode) and is quite effective as seen from the [NO] level maintained, 10 and 70–230 ppm, respectively. These cases are mixtures without $CO_2$ or CO. With $CO_2$ and CO present, lower temperatures are required to obtain similar effects with the SCR Mode.

Case 9 shows the effect of lengthening the residence time and optimizing the proportions of $iC_4H_{10}$ and $O_2$ in order to decrease the reaction temperature.

Case 10 illustrates the use of an oxygenated hydrocarbon with this reduction process. In this situation, acetone is used instead of isobutane.

Case 11 demonstrates the application of a commercial-type gasoline, Exxon Plus, in place of the isobutane.

TABLE I

Reduction of Nitric Oxide (NO) by Isobutane

| Case No. | NO in ppm prior to $iC_4H_{10}$ Addition (Bal. is $N_2$ in all cases) | | NO in ppm with $iC_4H_{10}$ addition | $\frac{[C]}{[NO]}$ | $\frac{[O_2]^b}{[NO]}$ | Temp. °C. | Residence Time Millisec |
|---|---|---|---|---|---|---|---|
| 1 | 1000+13% | $CO_2$+1% CO | 270 | 1.2 | 1.5 | 1227 | 100 |
| 2 | 1000 do. | do. | 50 | 4 | 5 | 1227 | 100 |
| 3 | 1000 do. | do. | 100 | 4 | 5 | 1127 | 100 |
| 4 | 1000 do. | do. | 650 | 8 | 0 | 1127 | 100 |
| 5 | 1000 do. | do. | 120 | 8 | 7 | 1127 | 100 |
| 6 | 1000 | | 120 | 16 | 4 | 1377 | 100 |
| 7 | 1000 | | 10 (for 1/2 hr.) | $0^a$ (8) | $0^a$ (2) | 1375 | 100 |

TABLE I — Continued

Reduction of Nitric Oxide (NO) by Isobutane

| Case No. | NO in ppm prior to iC$_4$H$_{10}$ Addition (Bal. is N$_2$ in all cases) | | NO in ppm with iC$_4$H$_{10}$ addition | $\frac{[C]}{[NO]}$ | $\frac{[O_2]^b}{[NO]}$ | Temp. °C. | Residence Time Millisec |
|---|---|---|---|---|---|---|---|
| 8 | 1000 | | 70 to 230 (for 1 hr.) | 0$^a$ (16) | 0$^a$ (4) | 1240 | 100 |
| 9 | 1000+13% | CO$_2$+1% CO | 390 | 4 | 10 | 830 | 174 |
| 10 | 1000$^c$+13% | CO$_2$+1% CO | 390$^c$ | 76 | 7 | 1027 | 174 |
| 11 | 1000$^d$+13% | CO$_2$+1% CO | 70$^d$ | 8 | 10 | 1135 | 100 |

$^a$Intermittent mode: iC$_4$H$_{10}$ and O$_2$ are shut off, after reaction tube has been conditioned with the ratios of iC$_4$H$_{10}$ and O$_2$ indicated in parentheses, for 10–15 minutes.
$^b$Water vapor is formed and thus present in all these reactions in amounts roughly equal to the NO concentration.
$^c$Acetone was used here instead of iC$_4$H$_{10}$ for the reduction process. Some minor fraction of the NO may have been catalytically reduced by CO.
$^d$"Exxon Plus gasoline" was used here instead of isobutane.

As indicated previously, the combined addition of oxygen (O$_2$) in the form of air, along with the hydrocarbon is vital to the process minimizing both NO and HCN. First, shown below in Table II are examples of the effect of side product formation, viz. HCN and NH$_3$. After a final stage of oxidation, the total NO allowed to pass into the air would be the sum of NO remaining after reduction plus NO from oxidation of HCN and NH$_3$.

TABLE II

| Case No. | NO in ppm prior to iC$_4$H$_{10}$ addition (Bal. is N$_2$ in all cases) | Temp. °C. | Res. Time msec | $\frac{[C]}{[NO]}$ | $\frac{[O_2]}{[NO]}$ | NO in ppm with iC$_4$H$_{10}$ addition | | |
|---|---|---|---|---|---|---|---|---|
| | | | | | | [NO] | [HCN] | [NH$_3$] |
| 12 | 1000 | 1227 | 100 | 4 | 5 | 50 | 12 | 44 |
| 13 | 1000 | 1277 | 100 | 48 | 32 | 75 | — | 28 |
| 14 | 1000 | 910 | 200 | 40 | 30 | 55 | 14 | — |
| 15 | 1000 | 1200 | 200 | 40 | 30 | 75 | 10 | — |

TABLE III

| Temp. (°C.) | 967 | 1102 | 1112 | 1177 | 1247 |
|---|---|---|---|---|---|
| % iC$_4$H$_{10}$ Reacted | 0 | 62 | 59 | 93 | 98 |
| % NO Reacted | 0 | 18 | 35 | 100 | 100 |

EXAMPLE 2

In a commercial Cleaver-Brooks Furnace, No. 6 Fuel Oil enters the furnace and air is added thereto. The principal flame occurs at the main combustion area and the heat is used for heating a boiler. The nitric oxide formed is carried downstream in the effluent gas where it is mixed with a mixture of propane and nitrogen. Air (oxygen) is not needed with the propane since the furnace effluent generally causes enough excess oxygen downstream to provide the correct ratio of [O$_2$]/[C]. The propane is injected into the furnace through water-cooled probes. The unburned hydrocarbon, CO and any small amounts of HCN and NH$_3$ are oxidized at a final stage by adding air at the elevated temperature of the effluents, e.g., 1100°C. The clean effluent finally exits from the furnace.

Figure 3:
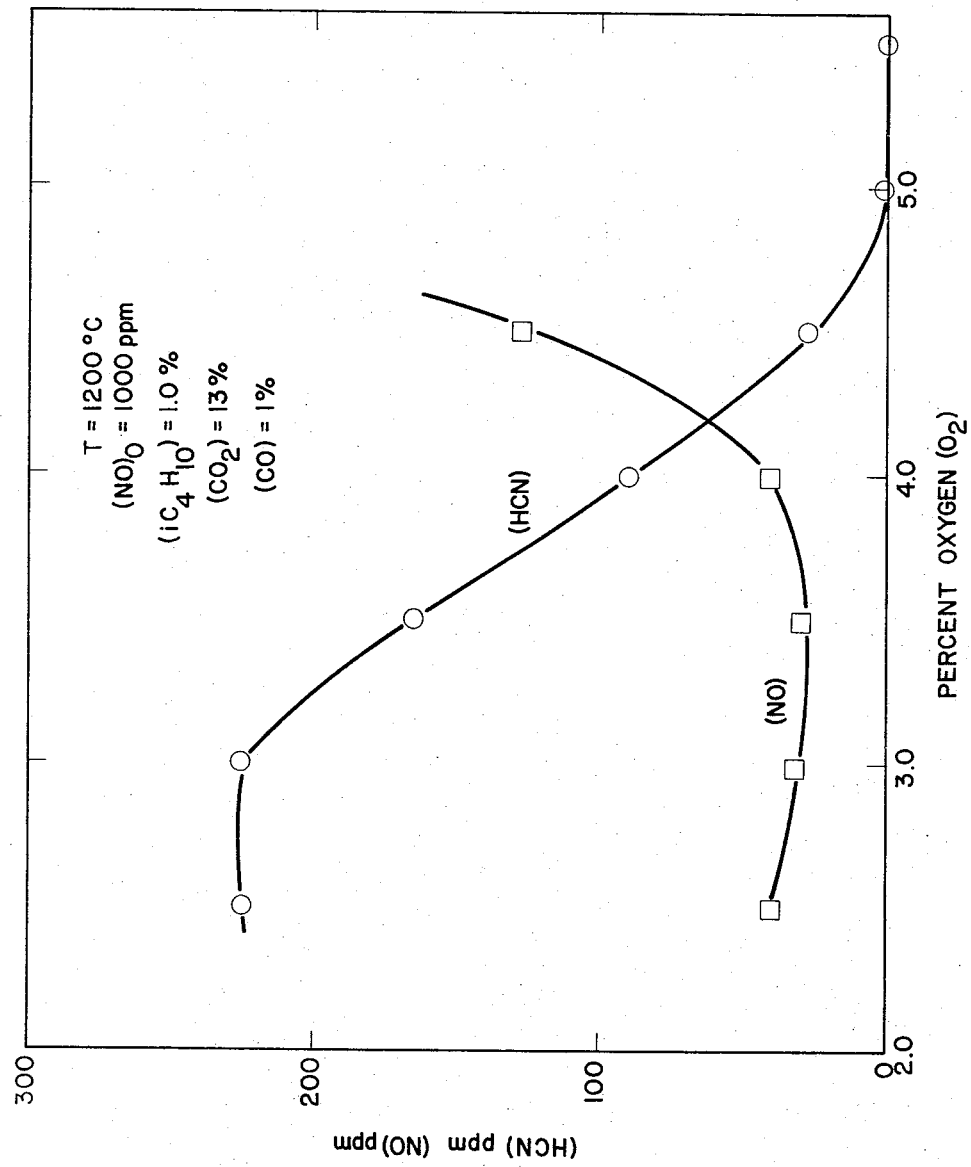

Second, in the accompanying graph of FIG. 3 are shown data which illustrate how increasing oxygen partial pressure actually decreases the amount of HCN present in the effluent under the conditions described.

Additional data corresponding to very short residence times (1 to 2 millisec) and high pressures (13 atmospheres) have also been obtained using a single pulse shock tube, which show that NO is reduced completely by iC$_4$H$_{10}$, by 1,177°C. as shown below in Table III for a mixture of 0.2% NO and 1.0% iC$_4$H$_{10}$ in argon.

Data obtained are shown in Table IV.

TABLE IV

REDUCTION OF NITRIC OXIDE BY C$_3$H$_8$ IN CLEAVER-BROOKS FURNACE

| Case No. | Normal NO, in ppm, Without C$_3$H$_8$ Reduction | NO, in ppm With C$_3$H$_8$ Addition | Excess Air$^a$ Based on oil + C$_3$H$_8$ | Temp.$^b$ °C. | Residence Time Millisec |
|---|---|---|---|---|---|
| 1 | 330 | 195 | 5% | 1697 | 30 |
| 2 | | 175$^c$ | do. | | |
| 3 | | 145 | 0% | | |
| 4 | | 125$^c$ | do. | | |
| 5 | | 115 | −10% | | |
| 6 | | 90$^c$ | do. | | ↓ |
| 7 | | 232 | 5% | | 60 |
| 8 | | 213$^c$ | do. | | |
| 9 | | 180 | 0% | | |
| 10 | | 162$^c$ | do. | | |
| 11 | | 100 | −20% | | |
| 12 | ↓ | 73$^c$ | do. | ↓ | ↓ |

$^a$Oxygen (O$_2$) always at 3% excess, based on fuel oil only.
$^b$One foot of cooling allowed to yield this temperature.
$^c$Each of these experiments represents a higher degree of mixing than its intermediate predecessor, by the use of increased nitrogen diluent.

What is claimed is:

1. A thermal method for treating a stream of combustion effluents issuing from either a mobile or stationary source containing $NO_x$ and other contaminants; said method comprising the step of injecting into said stream a hydrocarbon compound and oxygen in sufficient amounts to maintain the ratio of [C] to [$NO_x$] no greater than 32 to 1 and the ratio of oxygen molecules to carbon atoms no greater than 2.5 to 1, said hydrocarbon compound being one selected from the group consisting of hydrocarbons, oxygen-containing hydrocarbons, nitrogen-containing hydrocarbons, halogen-containing hydrocarbons, and sulfur-containing hydrocarbons at a temperature ranging from 400° to 2,700°C for a sufficient time to substantially reduce the $NO_x$ to molecular nitrogen.

2. A thermal method for treating the exhaust gas of internal combustion engines containing CO, $NO_x$ and other contaminants, said method comprising the steps of injecting into the exhaust gas, gasoline and air in sufficient amounts to maintain the ratio of [C] to [$NO_x$] no greater than 32 to 1 and the ratio of oxygen to carbon atoms in a range no greater than 2.5 to 1 at a temperature ranging from 700°C to 1,450°C for a sufficient time to reduce the $NO_x$ to molecular nitrogen and then contacting the reduced exhaust gas with a sufficient amount of oxygen to oxidize the excess hydrocarbon, CO and other oxidizable contaminants to less objectionable products upon emission into the atmosphere.

3. A method according to claim 2 wherein the residence time ranges from 25 to 250 milliseconds.

4. A method according to claim 1 wherein said hydrocarbon is a commercial grade gasoline.

5. A method according to claim 1 further including the step of intermittently contacting the effluent stream with said hydrocarbon and oxygen.

6. A thermal method for treating the effluent gas from a stationary source containing CO, $NO_x$ and other contaminants, said method comprising the steps of injecting into said effluent a hydrocarbon and air, in sufficient amounts to maintain the ratio of [C] to [$NO_x$] no greater than 32 to 1 and the ratio of oxygen molecules to carbon atoms no greater than 2.5 to 1, at a temperature ranging from 700°C to 2200°C for a sufficient time to reduce the $NO_x$ to molecular nitrogen; contacting the reduced effluent gas with a sufficient amount of oxygen to oxidize the excess hydrocarbon, CO and other oxidizable contaminants to less objectionable products upon admission to the atmosphere.

7. A method according to claim 6 wherein the ratio of $O_2/C$ in the second contacting is greater than 1.

* * * * *